United States Patent [19]
Roberts et al.

[11] 3,814,544
[45] June 4, 1974

[54] BATTERY-POWERED AUXILIARY SUMP PUMP

[75] Inventors: Richard J. Roberts; Eduard F. Kamberg, both of Deerfield, Ill.

[73] Assignee: Aqua-Not, Inc., Highland Park, Ill.

[22] Filed: June 15, 1972

[21] Appl. No.: 262,965

[52] U.S. Cl.................................. 417/40, 417/411
[51] Int. Cl............................................ F04b 49/04
[58] Field of Search.......... 320/48; 417/36, 40, 411, 417/44

[56] References Cited
UNITED STATES PATENTS

| | | | |
|---|---|---|---|
| 2,741,987 | 4/1956 | Murphy et al. | 417/44 |
| 2,791,749 | 5/1957 | Godshalk | 320/48 |
| 3,217,225 | 11/1965 | Gottlieb | 320/48 |
| 3,217,226 | 11/1965 | Strain | 320/48 |
| 3,558,239 | 1/1971 | Schiber | 417/3 |
| 3,708,738 | 1/1973 | Crawford et al. | 320/40 |
| 3,726,606 | 4/1973 | Peters | 417/44 |

*Primary Examiner*—William L. Freeh
*Attorney, Agent, or Firm*—Edward C. Threedy

[57] ABSTRACT

A self-contained auxiliary sump pump battery-powered in response to a float switch, including an electrical battery charger for maintaining the battery in condition to operate the pump and having a battery condition indicator, a charger operating light, a manual test switch for actuating the sump pump, and a timer unit for automatically operating the unit through a test cycle.

1 Claim, 4 Drawing Figures

PATENTED JUN 4 1974 3,814,544
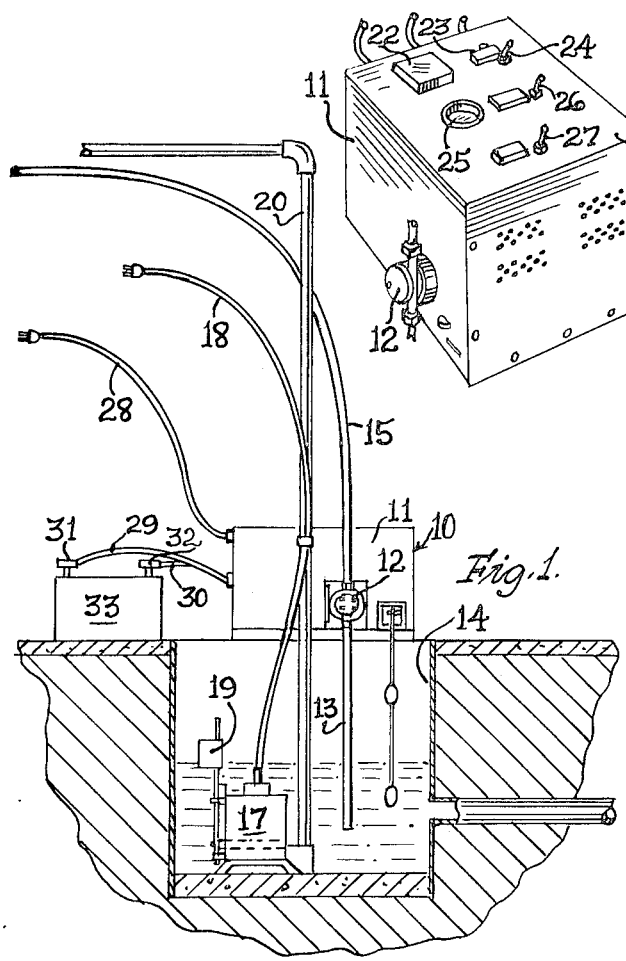
Fig.2.
Fig.1.
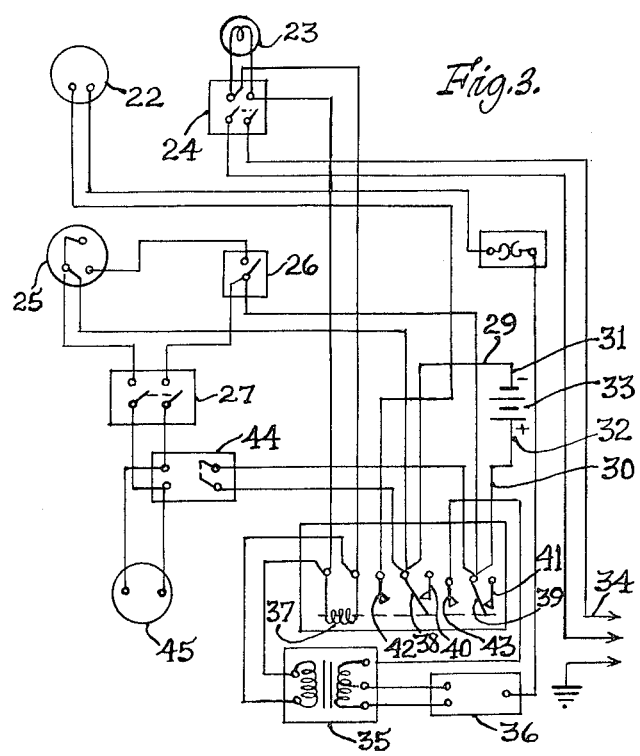
Fig.3.
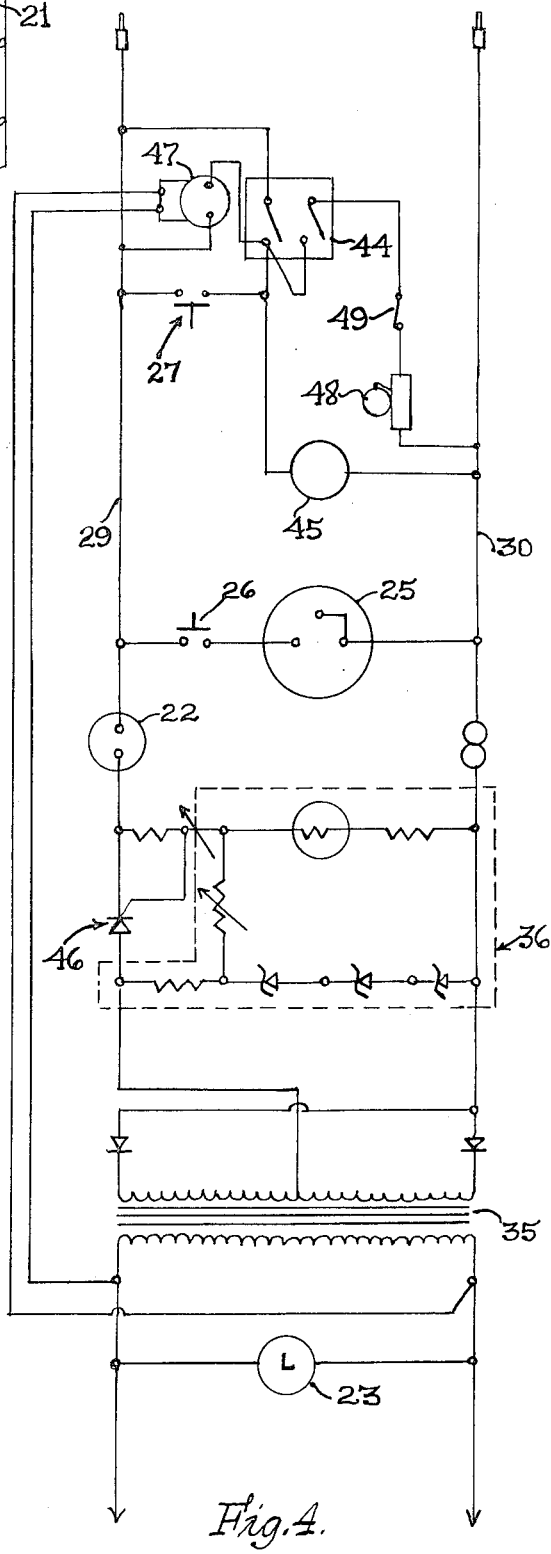
Fig.4.

BATTERY-POWERED AUXILIARY SUMP PUMP

SUMMARY OF THE INVENTION

A self-contained and self-controlled battery-powered sump pump unit adapted to be associated with a principal sump pump operable on household electrical current. The auxiliary sump pump is adapted to be operable only upon the failure of the principal pump and/or failure of the latter's electrical power source.

The auxiliary pump operation is controlled by a float switch which is functional only beyond the normal operating level of the principal sump pump. An audible alarm may be included to reveal the operation of the auxiliary sump pump unit.

Being battery-powered, the auxiliary sump pump unit is provided with a charging unit that may be independently operated or be fully automatic responsive to the charged condition of the battery. These circuitries may include a momentary battery test switch to energize a battery condition indicator, an ammeter to visually disclose the charging rate for the battery, and a charging circuit indicating light. The circuitries may include a timer unit for periodically automatically energizing the sump pump unit during a test cycle.

GENERAL DESCRIPTION

The invention is best shown in the accompanying drawings which indicate the preferred embodiment of the unit as well as the circuitries associated therewith and in which:

FIG. 1 is a fragmentary sectional detail view of the auxiliary sump pump unit in an operable relation to a principal sump pump station;

FIG. 2 is a perspective view of the self-contained unit of this invention;

FIG. 3 is a schematic diagram of an operating circuit for the invention; and

FIG. 4 is an equivalent circuit for a fully automatic operating unit.

The invention relates to an apparatus for removing by a pumping action water from a sump area, and more particularly to a battery-powered device utilized on an emergency basis in the event of a main or principal sump pump failing to operate properly.

Sump pumps currently available are designed to be operated on available electrical current. If such current is interrupted, for instances, by an electrical storm or other unforeseeable cause, the sump pump cannot operate. Since such power failures usually occur during or as a result of a storm, the sump is likely to overflow and cause a flooding condition. It is to prevent such occurrences that this invention is directed.

The apparatus of this invention will also operate as a result of an increase in the water level in a sump, the occurrence of which may be due to mechanical failure of the main or principal sump pump.

The auxiliary sump pump consists of a self-contained unit 10 which on one side wall 11 is provided with a T joint 12, one end of which connects to a siphon tube 13, the free end of which is disposed within a formed sump 14. The other end of the joint 12 is connected to the discharge hose 15 of the sump pump unit 10. The remaining end of the joint is associated with a pump, hereinafter referred to, within the unit 10.

As shown in FIG. 1, the sump pump unit 10 is placed in close proximity to the sump 14 but physically out of the fluid-receiving area 16 of such sump. A main or principal sump pump 17 is placed in the sump, when such unit is of the submersible type and is operable off a normal electrical supply source 18. The submersible pump 17 is operable by a float valve 19 and includes a fixed exhaust pipe 20.

Referring to the self-contained unit 10, the top wall 21 thereof includes an ammeter 22 which is utilized to indicate the rate of charge when the battery charger hereinafter described is in operation. There is also provided an indicating light 23 for visually reflecting the condition of operation of the battery charger. When the unit 10 includes the circuit shown in FIG. 3, a control switch 24 is provided which will energize the battery charging circuit associated therewith. A battery conditioned indicator 25 is provided and becomes operable upon manual actuation of the battery test switch 26. A manually operated switch 27 is provided which will energize the circuit to the pump for periodic testing purposes. The self-contained unit 10 provides a cord 28 which is used to connect the unit to an electrical power supply, as well as cables 29 and 30 which will connect to the negative and positive terminals 31 and 32, respectively, of a battery 33.

The operation of the invention in accordance with the schematic circuitry shown in FIG. 3, indicates that the unit through a plug connection 34 is connected to a normal electrical supply source. The circuit includes a transformer 35 and a rectifier 36 which will change the alternating current to direct current for purposes of charging the battery 33.

With the unit connected to a normal electrical power source, when the battery 33 is to be tested, the switch 26 will be closed so as to connect the voltmeter 25 to the battery, such that a battery condition reading may be obtained. If it is found that the battery is in need of a charge, the battery charge switch 24 will be closed. This will initially energize the indicating light 23, revealing that the battery is being charged as required. The closing of the switch 24 will energize the relay 37, transferring the relay switch blades 38 and 39 from their respective contacts 40 and 41 to the contacts 42 and 43. These relay switches complete the circuitry of the charging current from the transformer 35 through the rectifier 36.

The possibility exists that during this charging operation, a power failure could occur, in which event the relay 37 would be deenergized, returning switch blades 38 and to their original positions, and when the float switch 44 closes by reason of rising of water in the sump, the pump 45 will be energized and effect discharge of the water.

The circuitry also includes the pump test switch 27 which, when manually closed, will by-pass the float switch 44 and energize the pump 45 for as long as the switch 27 is closed. With the energization of the relay 37 and the closing of the switch 38, a circuit will be made to the ammeter 22 which will indicate the charging rate for the battery 33.

When it is desired to use the invention with an automatic battery charging unit, the pump will be associated with the circuit shown in FIG. 4. In such circuit the normal household current will be applied to the transformer 35 and, through rectifier 36, a constant voltage source will be applied to the SCR gate 46. Through the suitable cable connections 29 and 30, a constant voltage is applied to the terminals of the battery as the same requires charging.

The voltmeter 25 may be actuated by the closing of the switch 26, and the pump 45 may be energized in a number of ways. To periodically test the operability of the pump 45, the pump test switch 27 may be closed. To automatically and periodically run the pump 45, there is provided a timer 47, which, when its respective contacts are closed, will result in energization of the pump 45, as the timer 47 by-passes both the float switch 44 and the test switch 27.

Associated with the float switch 44, which, when the water in the sump rises to a predetermined level, will be closed, is an alarm bell 48. It should be noted that this alarm bell 48 is only in circuit with the float switch 44, and therefore will only be energized to signal an alarm when the pump 45 is energized by reason of excess amount of water in the sump 14. A cut-off switch 49 is provided for the alarm bell so that after it reveals the energization of the pump 45 due to the condition of the sump, the bell may be deenergized.

From the foregoing, it is apparent that we have provided an auxiliary sump pump which has an independent operating cycle together with the necessary electrical components and circuitries for its operation.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variation and modifications as come within the scope of the appended claims.

We claim:

1. A battery-powered auxiliary sump pump apparatus remotely positioned with respect to a sump and an electrically operated main sump pump, wherein the improvement comprises
   a. a protective housing for the apparatus remotely positioned with respect to the main pump,
   b. a secondary pump within said housing and having external connections to a secondary sump siphon tube and a secondary sump discharge hose,
   c. a battery-powered electric circuit for said secondary pump,
   d. battery charging components for said battery including an electric circuit having a manually operable switch for energizing said battery charging components,
   e. a float switch in said battery circuit for energizing the apparatus in response to excess fluid levels in the sump,
   f. a test switch in parallel with said float switch in said battery circuit for energizing said secondary pump for testing its operating condition, and
   g. a control means providing a relay in circuit with said electrical circuit and a set of relay switches connected in said battery circuit with said relay being deenergized upon failure of said electrical circuit to actuate certain of said relay switches, so as to cooperate with said float switch to connect said secondary sump pump to said battery.

* * * * *